(12) United States Patent
Hayata et al.

(10) Patent No.: US 10,814,274 B2
(45) Date of Patent: Oct. 27, 2020

(54) CATALYTIC REACTOR AND SHIP PROVIDED WITH SAME

(71) Applicant: Yanmar Co., Ltd., Osaka-shi, Osaka-fu (JP)

(72) Inventors: Arata Hayata, Osaka (JP); Tsuyoshi Inoue, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 16/087,541

(22) PCT Filed: Aug. 23, 2016

(86) PCT No.: PCT/JP2016/074512
§ 371 (c)(1),
(2) Date: Sep. 21, 2018

(87) PCT Pub. No.: WO2017/163449
PCT Pub. Date: Sep. 28, 2017

(65) Prior Publication Data
US 2019/0232222 A1    Aug. 1, 2019

(30) Foreign Application Priority Data

Mar. 24, 2016 (JP) .................................. 2016-060983

(51) Int. Cl.
  *B01D 53/88* (2006.01)
  *B01D 53/94* (2006.01)
  (Continued)

(52) U.S. Cl.
  CPC ......... *B01D 53/88* (2013.01); *B01D 53/8631* (2013.01); *B01D 53/9431* (2013.01);
  (Continued)

(58) Field of Classification Search
  None
  See application file for complete search history.

(56) References Cited

U.S. PATENT DOCUMENTS 4,238,455 A * 12/1980 Ogiwara ............ B01D 53/8631
                                                      422/171
7,351,381 B2    4/2008 Ball et al.
(Continued)

FOREIGN PATENT DOCUMENTS

EP          1681446 A2    7/2006
JP      1989-085414 U    6/1989
(Continued)

OTHER PUBLICATIONS

Fukui et al. JP2011220172—translated document. (Year: 2011).*
(Continued)

*Primary Examiner* — Jelitza M Perez
(74) *Attorney, Agent, or Firm* — Norton Rose Fulbright US LLP

(57) ABSTRACT

A catalytic reactor including: a first opening located in a side surface of a catalytic reactor; a plurality of catalytic cassettes charged into the catalytic reactor through the first opening toward a side surface opposed to the first opening so that the plurality of catalytic cassettes is arranged adjacent to each other; and a fixing member configured to be urged by a first lid member closing the first opening and to press upper surfaces of the plurality of catalytic cassettes. The fixing member is disposed to extend along a direction from the first opening to the side surface opposed to the first opening.

20 Claims, 12 Drawing Sheets

(51) Int. Cl.
　　*B01D 53/86*　　(2006.01)
　　*F01N 3/20*　　(2006.01)
　　*F01N 3/28*　　(2006.01)
　　*F01N 13/00*　　(2010.01)

(52) U.S. Cl.
　　CPC ............ *F01N 3/2066* (2013.01); *F01N 3/28* (2013.01); *F01N 3/2842* (2013.01); *F01N 3/2878* (2013.01); *F01N 13/017* (2014.06); *B01D 2251/2067* (2013.01); *B01D 2259/4566* (2013.01); *F01N 2450/02* (2013.01); *F01N 2450/30* (2013.01); *F01N 2590/02* (2013.01)

(56) References Cited

U.S. PATENT DOCUMENTS

| | | |
|---|---|---|
| 2004/0009874 A1 | 1/2004 | Koike et al. |
| 2006/0228274 A1 | 10/2006 | Okada |
| 2009/0025376 A1 | 1/2009 | Ahmed |
| 2009/0293464 A1 | 12/2009 | Kaufmann et al. |

FOREIGN PATENT DOCUMENTS

| | | | |
|---|---|---|---|
| JP | 06-015138 A | | 1/1994 |
| JP | 6-182220 A | | 7/1994 |
| JP | 06-269679 A | | 9/1994 |
| JP | 07-232081 A | | 9/1995 |
| JP | 10-151324 A | | 6/1998 |
| JP | 11-033409 A | | 2/1999 |
| JP | 2002-219336 A | | 8/2002 |
| JP | 2004-017028 A | | 1/2004 |
| JP | 2006-291812 A | | 10/2006 |
| JP | 2011220172 A | * | 11/2011 |
| JP | 2013-208620 A | | 10/2013 |
| JP | 5498840 B2 | | 5/2014 |
| JP | 2014-156865 A | | 8/2014 |
| JP | 2014-188471 A | | 10/2014 |

OTHER PUBLICATIONS

International Search Report dated Oct. 18, 2016 issued in corresponding PCT Application PCT/JP2016/074512.
European Search Report dated Jan. 17, 2019 issued in corresponding EP Application 16895474.1.

* cited by examiner

CATALYTIC REACTOR AND SHIP PROVIDED WITH SAME

CROSS REFERENCES TO RELATED APPLICATIONS

This application is a national stage application pursuant to 35 U.S.C. § 371 of International Application No. PCT/JP2016/074512, filed on Aug. 23, 2016 which claims priority of under 35 U.S.C. § 119 to Japanese Patent Application No. 2016-060983 filed on Mar. 24, 2016, the disclosures of which are hereby incorporated by reference in their entireties.

TECHNICAL FIELD

The present invention relates to a catalytic reactor and a ship provided with the catalytic reactor.

BACKGROUND ART

Traditionally, there has been disclosed a catalytic reactor including: a plurality of catalytic cassettes disposed inside the catalytic reactor; and a wedge-shaped member inserted into a gap between, among the plurality of catalytic cassettes, catalytic cassettes charged into the catalytic reactor through an opening of the catalytic reactor to be arranged adjacent to each other, wherein the catalytic cassettes having been charged are urged by a lid member closing the opening, so that the catalytic cassettes are fixed inside the catalytic reactor (see Patent Literature 1 (hereinafter, referred to as PTL 1)).

The wedge-shaped member is supported at a housing via a coupling member provided to a side edge of the housing. The coupling member is a substantially bar-shaped member, and is configured to be extendable via a screw mechanism. By operating the screw mechanism of the coupling member, a wedge effect achieved by the wedge-shaped member is increased, so that the catalytic cassettes are fixed firmly.

CITATION LIST

Patent Literature

PTL 1: Japanese Patent Application Laid-Open No. 2014-188471

SUMMARY OF INVENTION

Technical Problem

In order to fix the catalytic cassettes to the catalytic reactor, it has been necessary to insert the wedge-shaped member there into and to operate the screw mechanism of the coupling member for achieving a suitable wedge effect, which is sometimes troublesome. Meanwhile, in order to fix, in the catalytic reactor, a larger number of catalytic cassettes, it has been necessary to individually insert wedge-shaped members into gaps between adjacent ones of the catalytic cassettes, which is sometimes troublesome. In view of the circumstances described above, some aspects of the present invention have an object to provide a catalytic reactor in which a plurality of catalytic cassettes can be easily fixed and a ship provided with the catalytic reactor.

Solution to Problem

A catalytic reactor according to an aspect of the present invention includes: an opening in a side surface of the catalytic reactor; a plurality of catalytic cassettes charged (inserted) into the catalytic reactor through the opening toward a side surface opposed to the opening so that the plurality of catalytic cassettes is arranged adjacent to each other; and a fixing member configured to be urged by a lid member closing the opening and to press upper surfaces of the plurality of catalytic cassettes, the fixing member including a plate-shaped member having a slope portion that is inclined and a pressing member having a slope portion that is inclined and is configured to abut on the slope portion of the plate-shaped member, and the fixing member being disposed to extend along a direction from the opening to the side surface opposed to the opening.

The catalytic reactor according to the aspect of the present invention is preferably configured such that each of the catalytic cassettes includes a catalyst part configured to reduce nitrogen oxide in exhaust gas and an outer peripheral part made of a frame covering side surfaces of the catalyst part, and the fixing member is disposed at a location which is between, among the plurality of catalytic cassettes, catalytic cassettes adjacent to each other and which is over the outer peripheral parts of the catalytic cassettes adjacent to each other.

The catalytic reactor according to the aspect of the present invention is preferably configured such that a filling material is disposed at a location which is between the catalytic cassettes adjacent to each other, the filling material extending along the direction from the opening to the side surface opposed to the opening.

A ship according to an aspect of the present invention includes the catalytic reactor described above.

Advantageous Effects of Invention

With the catalytic reactor according to the aspect of the present invention and the ship provided with the catalytic reactor, it is possible to easily fix a plurality of catalytic cassettes to the catalytic reactor.

DESCRIPTION OF EMBODIMENTS

Figure 1:
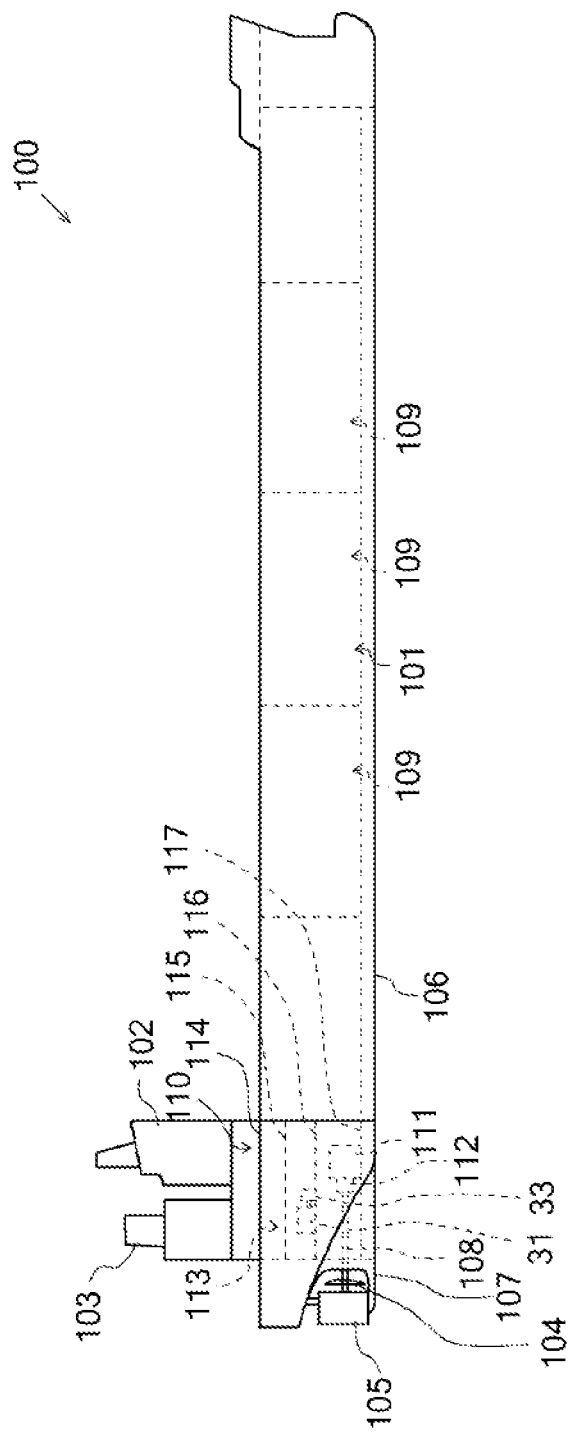
FIG. 1 is a side view of a ship.
Figure 2:
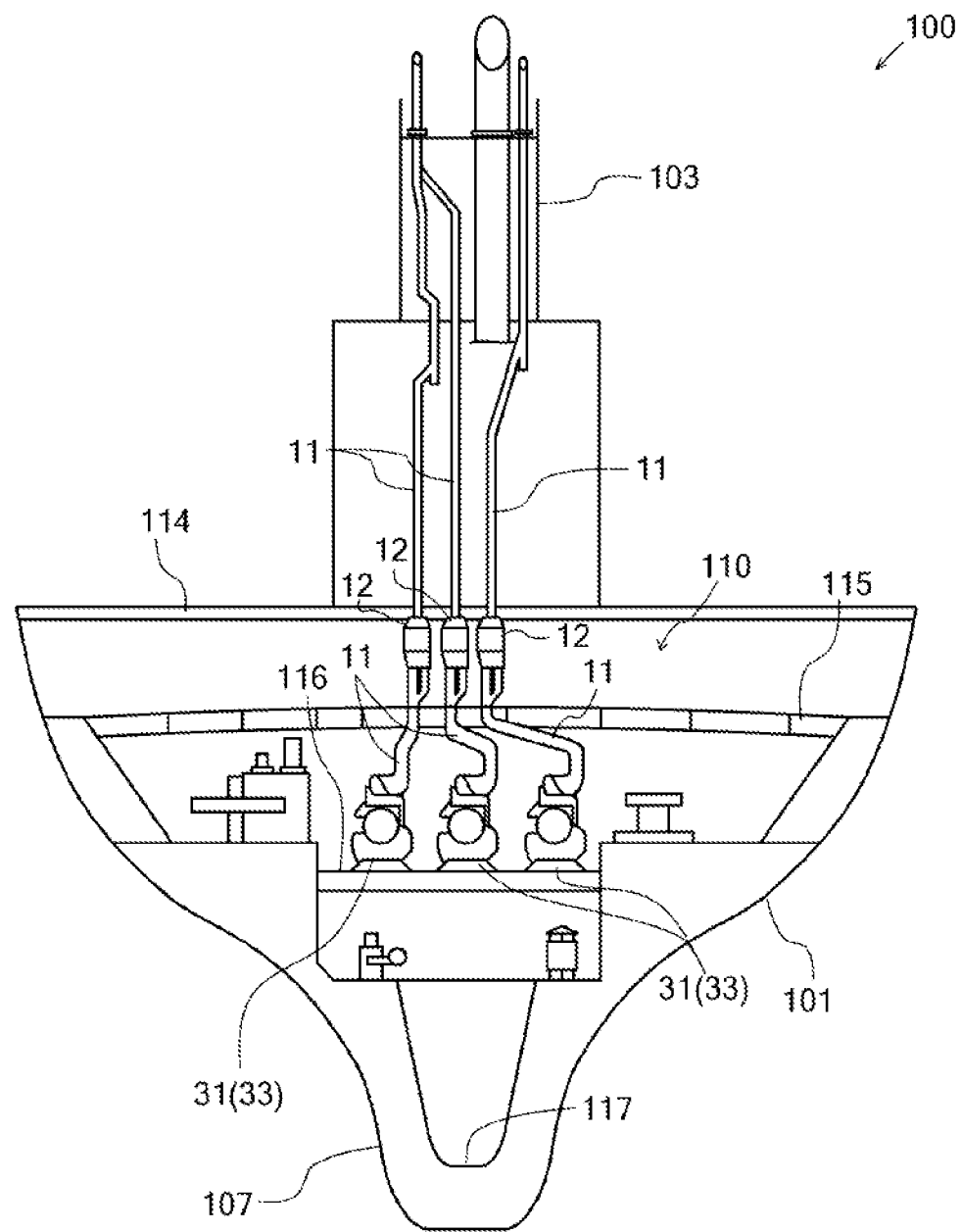
FIG. 2 is a front cross-sectional view of the ship.

With reference to FIGS. 1 and 2, the following will describe a ship 100 provided with a catalytic reactor 12.

Note that, an "upstream" described in the present embodiment refers to an upstream side in a flow direction of exhaust gas (i.e., an exhaust-gas flow direction), and a "downstream" in the present embodiment refers to a downstream side in the exhaust-gas flow direction. Note also that, a "width direction" in the present embodiment refers to a left-and-right direction of the catalytic reactor 12 when viewed from one side surface of the catalytic reactor 12 having an opening, and a "depth direction" in the present embodiment refers to a front-and-rear direction of the catalytic reactor 12 when viewed from the one side surface having the opening.

The ship 100 includes a ship body 101, a cabin 102 provided, in the ship body 101, at a location close to the stern, a funnel 103 located rearward of the cabin 102, and a propeller 104 and a rudder 105 provided in a rear lower part of the ship body 101. A skeg 107 is integrally provided to a part of the bottom 106 of the ship, the part being close to the stern. The skeg 107 pivotally supports a propulsion shaft 108 configured to rotate the propeller 104. A ship's hold 109 is provided in a region of the ship body 101, the region including a part close to the bow and a center part of the ship body 101. An engine room 110 is provided, in the ship body 101, at a location close to the stern.

In the engine room 110, a main engine 111 (in the present embodiment, a diesel engine) that is a driving source of the propeller 104, a speed reducer 112, and an electricity generating unit 113 for supplying electricity to electric systems in the ship body 101 are disposed. The propeller 104 is rotated by rotation power transmitted thereto from the main engine 111 via the speed reducer 112. The interior of the engine room 110 is divided vertically by an upper deck 114, a second deck 115, a third deck 116, and an inner bottom plate 117. In the present embodiment, the main engine 111 and the speed reducer 112 are placed on the inner bottom plate 117, which is the lowermost floor of the engine room 110, and the electricity generating unit is placed on the third deck 116, which is the middle floor of the engine room 110. The electricity generating unit includes combinations of engines 31 and electricity generators 33 for generating electricity when their corresponding engines 31 are driven.

Figure 3:
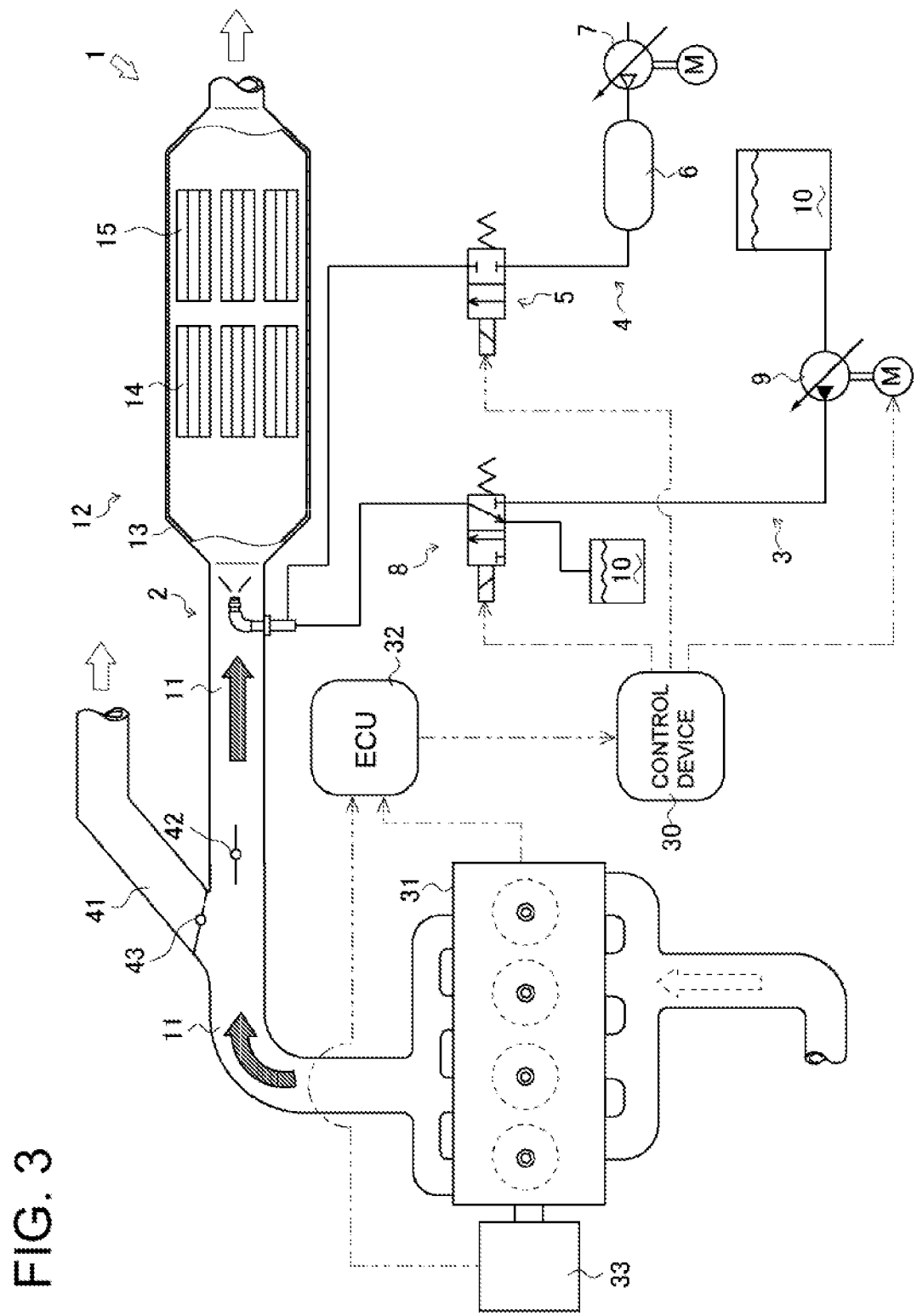
FIG. 3 is a view schematically illustrating an overall configuration of an exhaust gas purification device.
Figure 4A:
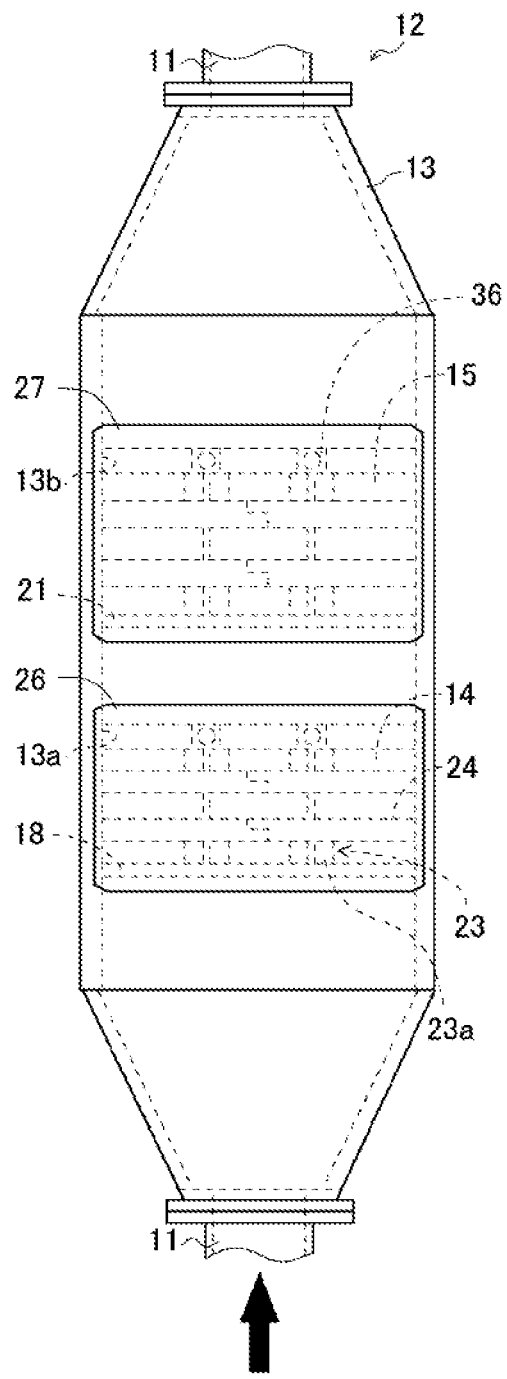
FIG. 4A is a front view of a catalytic reactor.
Figure 4B:
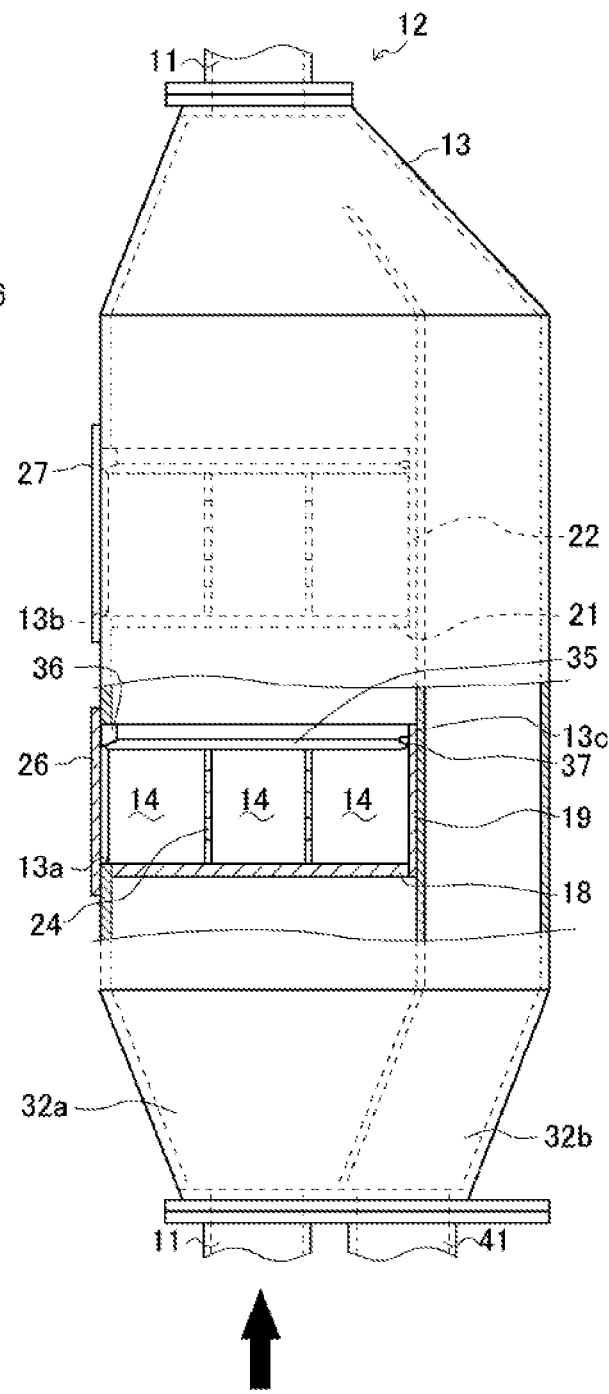
FIG. 4B is a side view of the catalytic reactor.

With reference to FIGS. 3 to 4B, the following will describe exhaust gas purification devices 1.

Each of the exhaust gas purification devices 1 purifies exhaust gas emitted from a corresponding one of the engines 31, which is a driving power source of a corresponding one of the electricity generators 33 and the like. The exhaust gas purification device 1 is provided in its respective exhaust pipe 11 connected to the engine 31. The exhaust pipe 11, which extends to the funnel 103, directly communicates with the outside. The exhaust gas purification device 1 includes components such as a urea water injection nozzle 2, a urea supply flow path 3, an air supply flow path 4, a pressurized air valve 5, an air tank 6, a pressurized-air supply pump (compressor) 7, a switching valve 8, a urea-water supply pump 9, a urea water tank 10, the catalytic reactor 12, and a control device 30.

The urea water injection nozzle 2 is configured to supply urea water into the exhaust pipe 11 or the catalytic reactor 12. The urea water injection nozzle 2 is made of a tubular member, and has one side (downstream side) inserted into the exhaust pipe 11 or into the catalytic reactor 12 from the outside. The urea water injection nozzle 2 is connected to the urea supply flow path 3, which is a flow path of urea water. The urea water injection nozzle 2 is also connected to the air supply flow path 4, which is a flow path of pressurized air.

The pressurized air valve 5 opens or shuts off the flow path of pressurized air. The pressurized air valve 5 is disposed in the air supply flow path 4. The pressurized air valve 5 is a solenoid valve having a solenoid that is connected to the control device 30. The pressurized air valve 5 is capable of supplying, to the urea water injection nozzle 2, pressurized air in the air tank 6 pressurized by the pressurized-air supply pump 7 (compressor), as a result of sliding movement of a spool (not illustrated).

The switching valve 8 switches the flow path of urea water from one to another. The switching valve 8 is disposed, in the air supply flow path 4, at a location downstream of the urea-water supply pump 9. The switching valve 8 is capable of supplying, to the urea water injection nozzle 2, urea water in the urea water tank 10 by the urea-water supply pump 9, as a result of sliding movement of a spool (not illustrated).

The catalytic reactor 12 is configured to reduce exhaust gas (nitrogen oxide (NOx) in the exhaust gas) with NOx catalysts disposed inside the catalytic reactor 12. The catalytic reactor 12 is disposed in an intermediate portion of the exhaust pipe 11 connected to the engine 31 such that the catalytic reactor 12 is located downstream of the urea water injection nozzle 2. The catalytic reactor 12 has a housing 13 including, in its inside, a plurality of catalytic cassettes each including a metallic frame and a NOx catalyst incorporated into the metallic frame.

The control device 30 controls components such as the pressurized air valve 5, the switching valve 8, and the urea-water supply pump 9. In the control device 30, various programs and data for controlling the components such as the pressurized air valve 5, the switching valve 8, and the urea-water supply pump 9 are stored. The control device 30 may have a configuration in which a CPU, a ROM, a RAM, an HDD, and/or the like are connected to each other via a bus, or may have a configuration made of a single-chip LSI and/or the like. The control device 30 can be integrated with an ECU for controlling the engine 31.

In the exhaust gas purification device 1 configured as above, the control device 30 controls components such as the pressurized air valve 5, the switching valve 8, and the urea-water supply pump 9 so that urea water is injected into the exhaust pipe 11. From the urea water injected due to heat of exhaust gas, ammonia is generated. The exhaust gas purification device 1 reduces NOx to nitrogen and water with use of ammonia and the NOx catalysts incorporated into the catalytic cassettes in the catalytic reactor 12.

Next, with reference to FIGS. 3 to 6, the following will specifically describe the catalytic reactor 12.

The catalytic reactor 12 includes components such as the housing 13, the catalytic cassettes for reducing exhaust gas from the engine 31, support frames for supporting the catalytic cassettes in the housing 13, and a fixing member 34 for fixing the catalytic cassettes.

The housing 13 is made of a heat-resistant metallic material, and is shaped in a substantial cylinder (in the present embodiment, a prismatic cylinder). The housing 13 has one side edge connected to the exhaust pipe 11 and the other side edge opened to the outside via the exhaust pipe 11. Namely, the housing 13 is an exhaust gas flow path allowing exhaust gas from the engine 31 to flow from the one side (upstream side) to the other side (downstream side) (see the black arrows in FIG. 4A and FIG. 4B).

The exhaust pipe 11 is provided with a branch pipe 41 and exhaust switching valves 42 and 43, each of which is located upstream of the urea water injection nozzle 2. The exhaust switching valves 42 and 43 are configured to switch a passage of exhaust gas from one to another. The branch pipe 41 is connected to the exhaust pipe 11. The exhaust switching valve 42 is disposed upstream of the urea water injection nozzle 2 and inside a portion of the exhaust pipe 11, the portion being downstream of the branch pipe 41. The exhaust switching valve 43 is disposed inside the branch pipe 41.

The exhaust switching valves 42 and 43 can be opened and closed in conjunction with each other. Specifically, the exhaust switching valves 42 and 43 are configured to operate as below. That is, while the exhaust switching valve 42 is in an open state, the exhaust switching valve 43 is in a close state. While the exhaust switching valve 42 is in a close state, the exhaust switching valve 43 is in an open state. Consequently, while the exhaust switching valve 42 is in an open state and the exhaust switching valve 43 is in a close state, a passage for supplying exhaust gas to a main flow path 32a (described later) is formed in the exhaust pipe 11. Meanwhile, while the exhaust switching valve 42 is in a close state and the exhaust switching valve 43 is in an open state, a passage for supplying exhaust gas to a bypass flow path 32b (described later) is formed in the exhaust pipe 11.

An interior of the exhaust gas flow path of the housing 13 is partitioned into the main flow path 32a and the bypass flow path 32b by a partitioning plate 13c extending along a direction in which exhaust gas travels. In the main flow path 32a, NOx in exhaust gas is reduced, so that the exhaust gas is purified. Meanwhile, the bypass flow path 32b is formed as a passage of exhaust gas, from which exhaust gas is discharged to the outside without being subjected to a purification treatment. The partitioning plate 13c is disposed to be opposed to lid members covering openings (described later).

The housing 13 includes one side surface having the openings used for, e.g., attachment, replacement, and repair of the catalytic cassettes. The openings include a first opening 13a and a second opening 13b, which are disposed in the one side surface of the housing 13, the one side surface constituting the main flow path 32a. The first opening 13a and the second opening 13b are arranged in this order from the upstream side. The openings are configured to be closed by the lid members. Specifically, the first opening 13a can be closed by a first lid member 26, and the second opening 13b can be closed by a second lid member 27.

Figure 5:
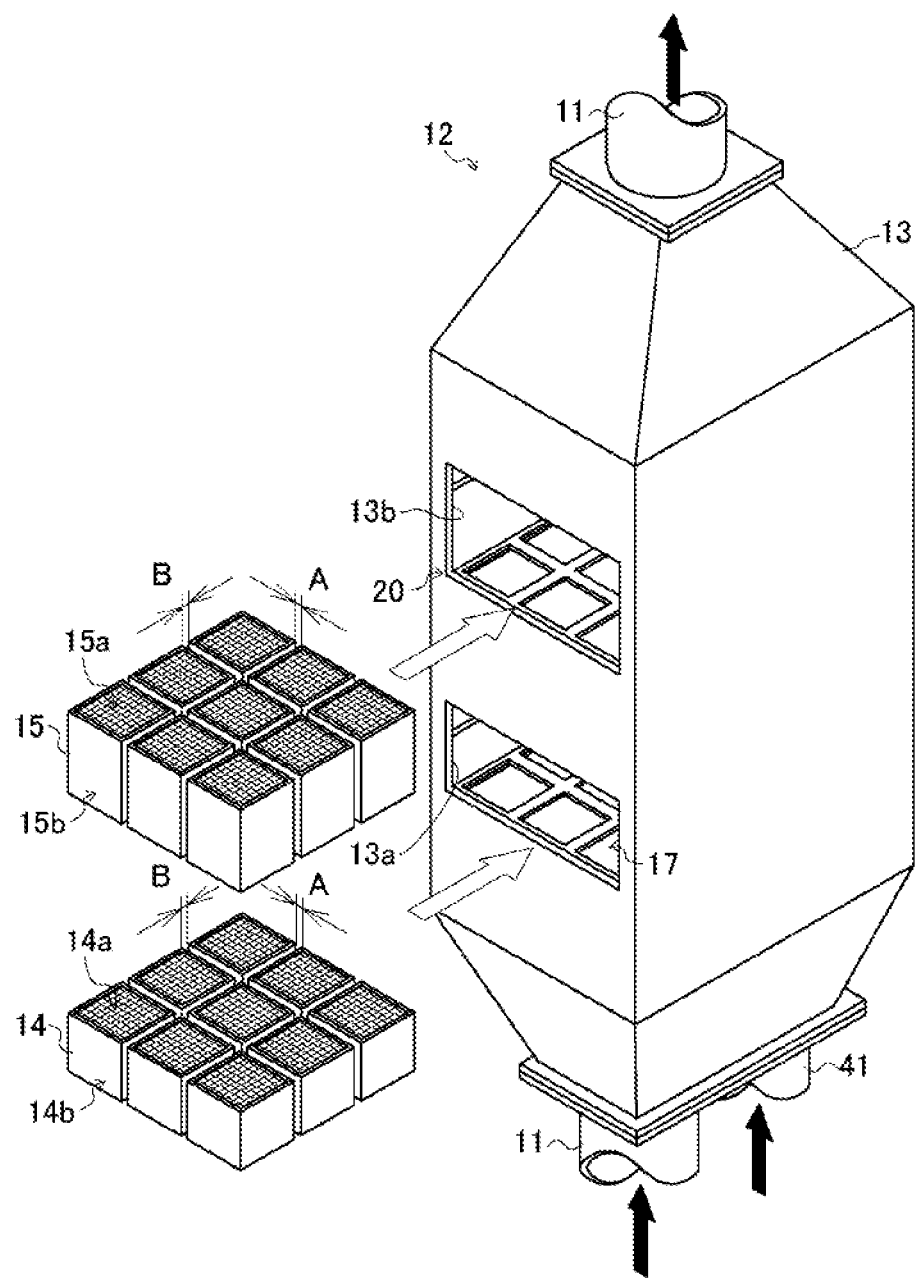
FIG. 5 is a perspective view of the catalytic reactor.
Figure 6:
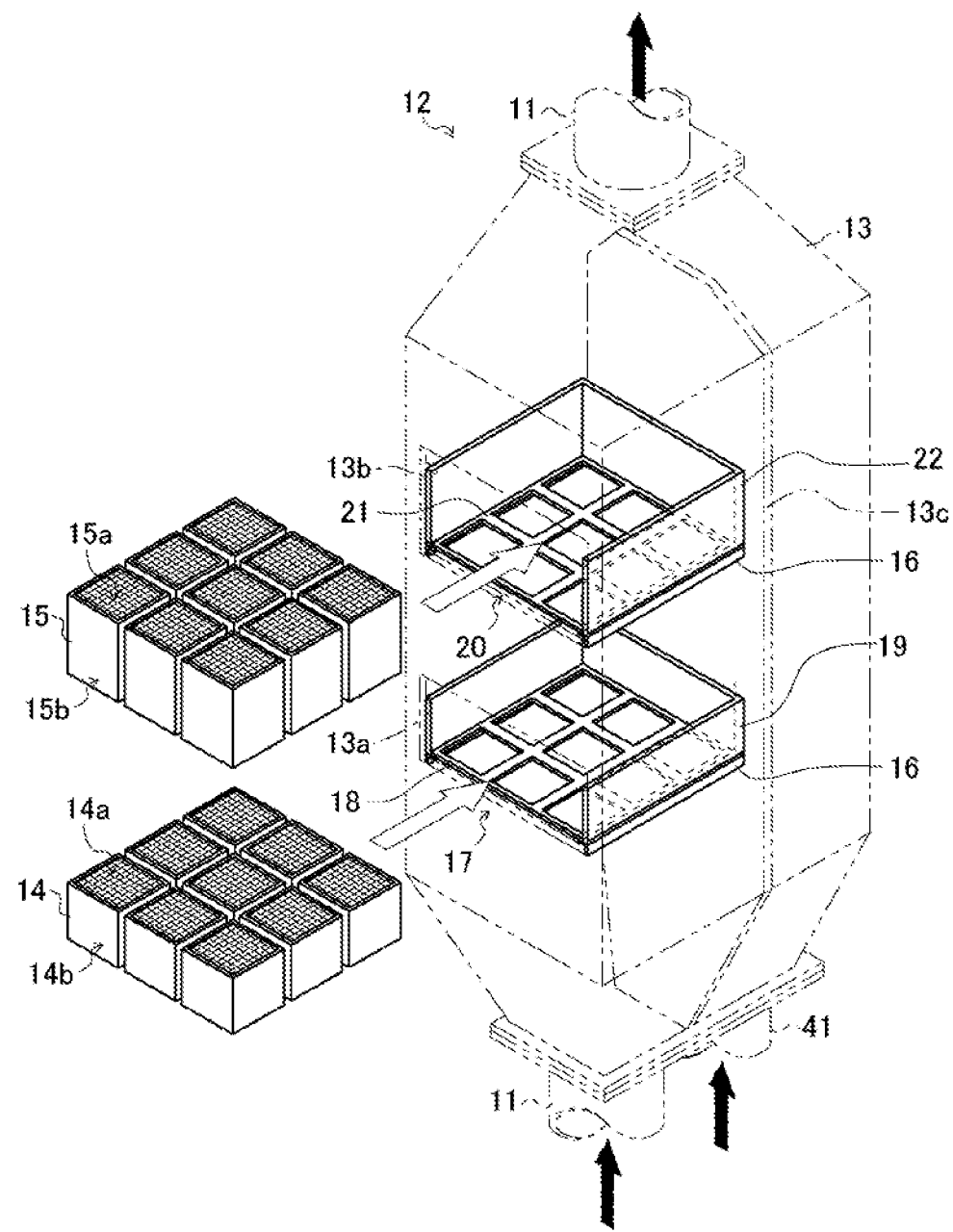
FIG. 6 is a perspective view of support frames supported inside the catalytic reactor.

As illustrated in FIGS. 5 and 6, each of the catalytic cassettes is constituted by a catalyst part made of a NOx catalyst for reducing exhaust gas and by an outer peripheral part made of a metallic frame covering side surfaces of the NOx catalyst, the side surfaces being not side surfaces on which through-holes are opened. The NOx catalyst is made of a material containing a metal such as alumina, zirconia, vanadia/titania, or zeolite, and is shaped in a substantial cuboid having a large number of through-holes arranged in a lattice. The catalytic cassettes include a plurality of first catalytic cassettes 14 charged through the first opening 13a and a plurality of second catalytic cassettes 15 charged through the second opening 13b.

Each of the first catalytic cassettes 14 includes a catalyst part 14a made of a NOx catalyst and an outer peripheral part 14b made of a metallic frame covering side surfaces of the NOx catalyst, the side surfaces being not side surfaces on which the through-holes are opened. Each of the second catalytic cassettes 15 includes a catalyst part 15a made of a NOx catalyst and an outer peripheral part 15b made of a metallic frame covering side surfaces of the NOx catalyst, the side surfaces being not side surfaces on which the through-holes are opened. Each of the catalyst parts 14a and 15a is formed in a substantial cuboid. Each of the outer peripheral parts 14b and 15b is formed in a substantial prismatic cylinder surrounding a corresponding one of the catalyst parts 14a and 15a.

Each of the catalytic cassettes is disposed so that axial directions of the through-holes of the NOx catalyst therein coincide with the exhaust-gas flow direction (see the black arrows in FIGS. 5 and 6). Namely, each of the catalytic cassettes is disposed so that the side surfaces of the catalytic cassette which are not covered by the frame are opposed to the flow of the exhaust gas. Consequently, the catalytic reactor 12 is configured to allow exhaust gas to pass through the first catalytic cassettes 14 placed on a first lattice frame 18 (described later), then to pass through the second catalytic cassettes 15 placed on a second lattice frame 21 (described later), and to exit from the housing 13.

As illustrated in FIG. 6, the support frames for supporting the catalytic cassettes are provided in the main flow path 32a of the housing 13. The support frames are disposed in a space surrounded by the housing 13 and the partitioning plate 13c. Each of the support frames is constituted by a lattice frame which is disposed near a lower edge of the opening and on which a plurality of catalytic cassettes charged through the opening is placed and by a wall extending downstream from an outer frame of the lattice frame. The wall is fixed in close contact with an inner side surface of the housing 13 and with the partitioning plate 13c. The lattice frame is fixed to the housing 13 via a stay 16.

The support frames include a first support frame 17 for supporting the plurality of first catalytic cassettes 14 charged through the first opening 13a and a second support frame 20 for supporting the plurality of second catalytic cassettes 15 charged through the second opening 13b. The first support frame 17 is constituted by a first lattice frame 18 on which the plurality of first catalytic cassettes 14 is placed and by a first wall 19 extending downstream from an outer frame of the first lattice frame 18. The second support frame 20 is constituted by a second lattice frame 21 on which the plurality of second catalytic cassettes 15 is placed and by a second wall 22 extending downstream from an outer frame of the second lattice frame 21.

Figure 7:
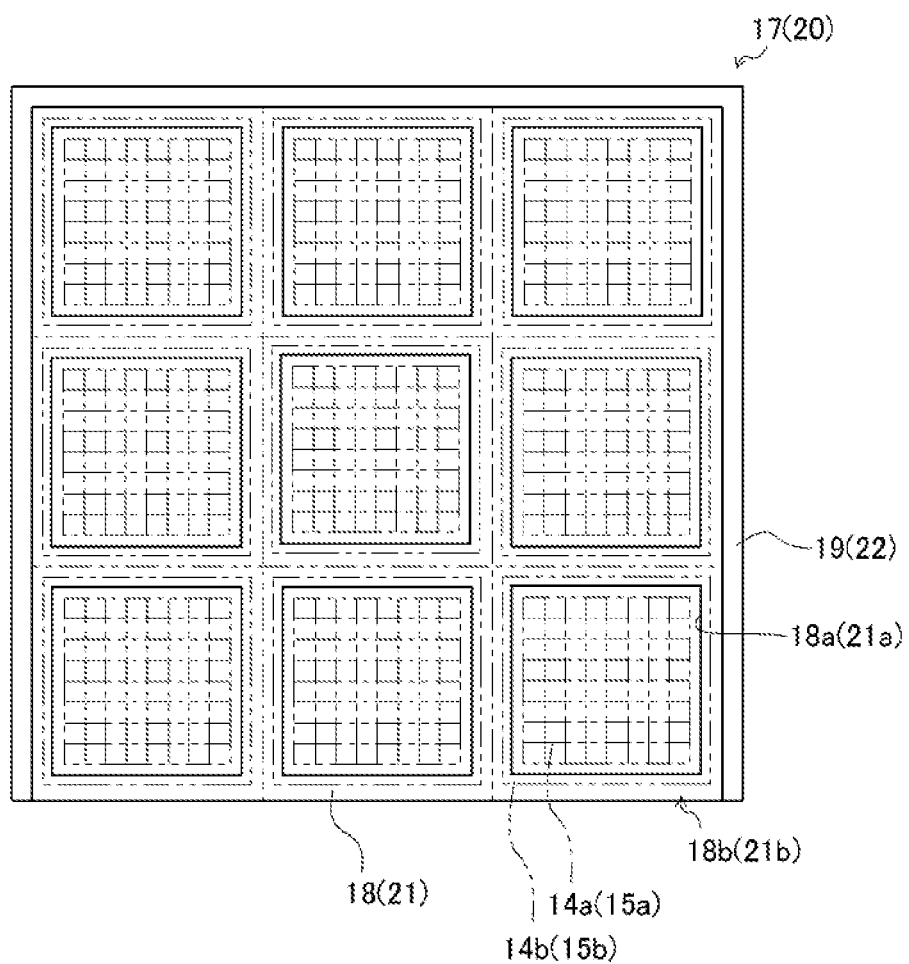
FIG. 7 is a view of the support frame viewed from a flow direction of exhaust gas.

As illustrated in FIGS. 6 and 7, each of the lattice frames is formed in a lattice constituted by a plurality of inflow holes through which exhaust gas flows into the catalyst parts in the catalytic cassettes and by frame parts defining the respective inflow holes. The first lattice frame 18 is constituted by a plurality of first inflow holes 18a and first frame parts 18b. The second lattice frame 21 is constituted by a plurality of second inflow holes 21a and second frame parts 21b. Each of the first inflow holes 18a and the second inflow holes 21a is formed in a substantial rectangle conforming to a corresponding one of the catalyst parts 14a and 15b, respectively. Each of the first frame parts 18b and the second frame parts 21b is formed as a substantially rectangular frame surrounding a corresponding one of the first inflow holes 18a and the second inflow holes 21a, each of which is formed in a substantial rectangle.

As illustrated in FIG. 7, the outer peripheral parts of the catalytic cassettes are configured to be accommodated in the respective frame parts constituting the lattice frame, when viewed from the exhaust-gas flow direction. Namely, in the configuration described above, the catalytic cassettes can be placed in the respective frame parts.

In the present embodiment, each of the outer peripheral parts 14b and 15b is formed in a substantial square when viewed from the exhaust-gas flow direction. Each of the first frame parts 18b and the second frame parts 21b is also formed in a substantial square when viewed from the exhaust-gas flow direction. A maximum length of each of the outer peripheral parts 14b and 15b of the catalytic cassettes is smaller than a maximum length of each of the first frame parts 18b and the second frame parts 21b. Consequently, the outer peripheral part of each of the catalytic cassettes can be accommodated in a respective one of the frame parts. The maximum length of each of the outer peripheral parts 14b and 15b herein refers to the longest one of sides defining an opening plane of the outer peripheral part. In a configuration in which the outer peripheral part has a circular cross-section when viewed from the exhaust-gas flow direction, the maximum length of each of the outer peripheral parts 14b and 15b herein refers to a long diameter. Similarly, the maximum length of each of the first frame parts 18b and the second frame parts 21b herein refers to the longest one of sides defining the frame part. In a configuration in which the frame part has a circular cross-section when viewed from the exhaust-gas flow direction, the maximum length of each of the first frame part 18b and the second frame part 21b herein refers to a long diameter.

The plurality of catalytic cassettes is charged through the opening toward the side surface opposed to the opening such that the catalytic cassettes are adjacent to each other. In the lattice frame, a total of nine catalytic cassettes are arranged in three rows in a width direction and three rows in a depth direction, when viewed from the opening. Namely, in the lattice frame, a total of nine inflow holes are formed in three rows in the width direction and three rows in the depth direction. The number of catalytic cassettes is not limited to this, and is determined based on the size of the exhaust gas purification device 1. Alternatively, for example, catalytic cassettes can be arranged in four rows in the width direction and four rows in the depth direction.

The catalytic cassettes are disposed such that side surfaces of the catalytic cassettes covered with the frame are adjacent to each other. Among the catalytic cassettes, catalytic cassettes adjacent to each other in the width direction are spaced apart from each other by a predetermined space A (see FIG. 5). In the predetermined space A, a filling material 23 (see FIG. 10) is disposed to extend along a direction from the opening to the side surface opposed to the opening. The filling material 23 is a plate-shaped member made of a heat insulating material such as glass wool. By disposing the filling material 23 such that the filling material 23 fills up the predetermined space A, it is possible to prevent a phenomenon that exhaust gas passes through the predetermined space A to flow downstream. In addition, by filling up the gap between adjacent ones of the catalytic cassettes, movement of the catalytic cassettes adjacent to each other in the width direction toward the support frame is regulated.

Among the catalytic cassettes, catalytic cassettes adjacent to each other in the depth direction are spaced apart from each other by a predetermined space B (see FIG. 5). In the predetermined space B, a filling material 24 (see FIG. 10) is provided along the width direction viewed from the opening. The filling material 24 is a plate-shaped member made of a heat insulating material such as glass wool. The filling material 24 is provided across the plurality of catalytic cassettes adjacent to each other in the width direction. By providing the filling material 24 such that the filling material 24 fills up the predetermined space B, it is possible to prevent a phenomenon that exhaust gas passes through the predetermined space B to flow downstream. In addition, by filling up the gap between the catalytic cassettes adjacent to each other, movement of the catalytic cassettes adjacent to each other in the depth direction toward the support frame is regulated.

With the configuration described above, the catalytic cassettes can be placed in the respective frame parts. Consequently, in a work for, e.g., charging, replacement, or repair of a catalytic cassette, which is a heavy object, in the catalytic reactor 12, it is not necessary to move multiple catalytic cassettes together. Rather, such a work can be performed by individually placing the target catalytic cassette in its position. Thus, the placement of the catalytic cassette can be performed easily. Consequently, the attachment workability of the catalytic cassette can be improved. Note that, the number of lattice frames provided in the catalytic reactor 12 and the number of catalytic cassettes placed on each of the lattice frames are not limited to the numbers described in the present embodiment.

With the configuration described above, arrangement of the catalytic cassettes can be easily changed according to degradation degrees of the catalytic cassettes that may vary depending on the positions of the catalytic cassettes on the lattice frame. Therefore, elongation of a service life of the catalyst part of the catalytic cassette can also be expected. In addition, with the configuration described above, in which the support frame is additionally provided to the housing 13, the strength of the housing 13 can be enhanced. Since the support frame, which includes the lattice frame, is provided, not only the strength of the housing 13 but also the attachment workability of the catalytic cassette can be improved.

As illustrated in FIGS. 4A to 6, support frames (lattice frames) each supporting a plurality of catalytic cassettes are provided at least on an upstream side and a downstream side inside the housing 13 included in the catalytic reactor 12. The first catalytic cassettes 14, which are provided in the first support frame 17 (first lattice frame 18) on the upstream side, are shorter in the exhaust-gas flow direction than the second catalytic cassettes 15, which are provided in the second support frame 20 (second lattice frame 21) on the downstream side. In the present embodiment, the support frames include the first support frame 17 provided on the upstream side and the second support frame 20 provided on the downstream side.

By disposing the catalytic cassettes separately on the upstream side and the downstream side, the catalytic cassettes having a lighter weight can be employed. Consequently, the attachment workability of the catalytic cassette can be improved. Exhaust gas passing through the first catalytic cassettes 14, which are disposed on the upstream side, contains a larger amount of NOx than that passing through the second catalytic cassettes 15, which are disposed on the downstream side. Therefore, the first catalytic cassettes 14 are apt to deteriorate, and thus are replaced with new ones with high frequency. In consideration of this, the first catalytic cassettes 14, which are disposed on the upstream side, are made shorter in the exhaust-gas flow direction than the second catalytic cassettes 15, which are disposed on the downstream side. Consequently, the first catalytic cassettes 14, which are apt to deteriorate, can be made at lower cost. This can reduce replacement cost.

Figure 8:
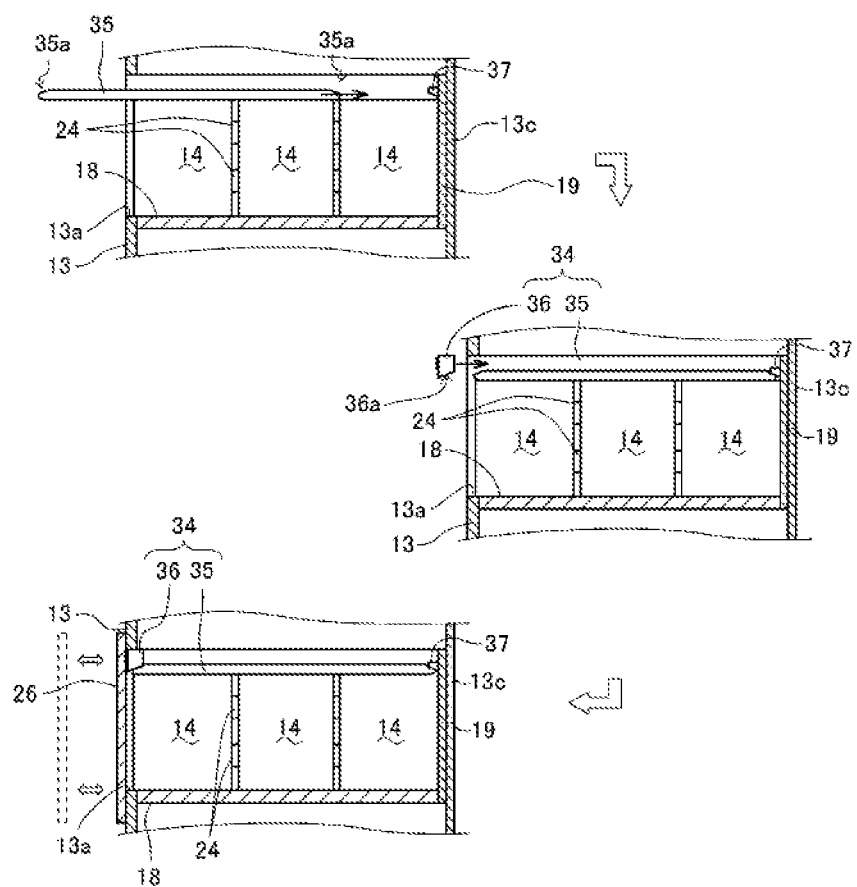
FIG. 8 shows views illustrating how catalytic cassettes are fixed to the catalytic reactor.
Figure 9A:
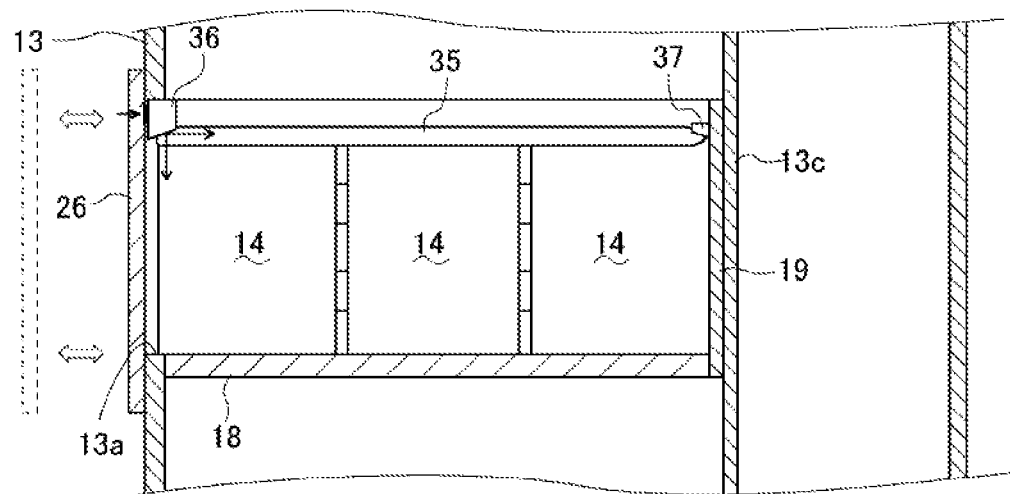
FIG. 9A is a side view illustrating force components generated when an opening is closed by a lid member.
Figure 9B:
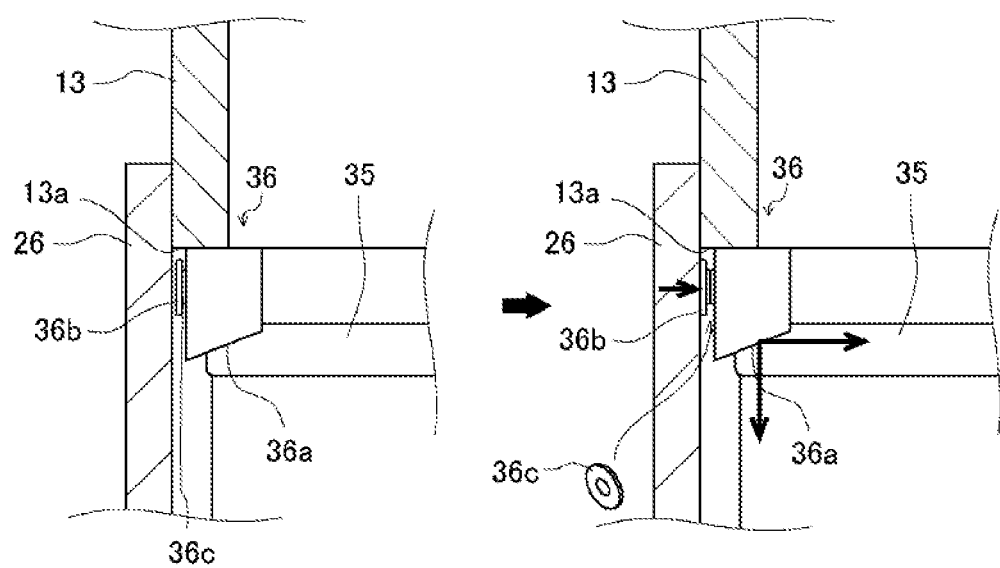
FIG. 9B is a partially enlarged views illustrating how adjustment on a protrusion of a pressing member is made.
Figure 10:
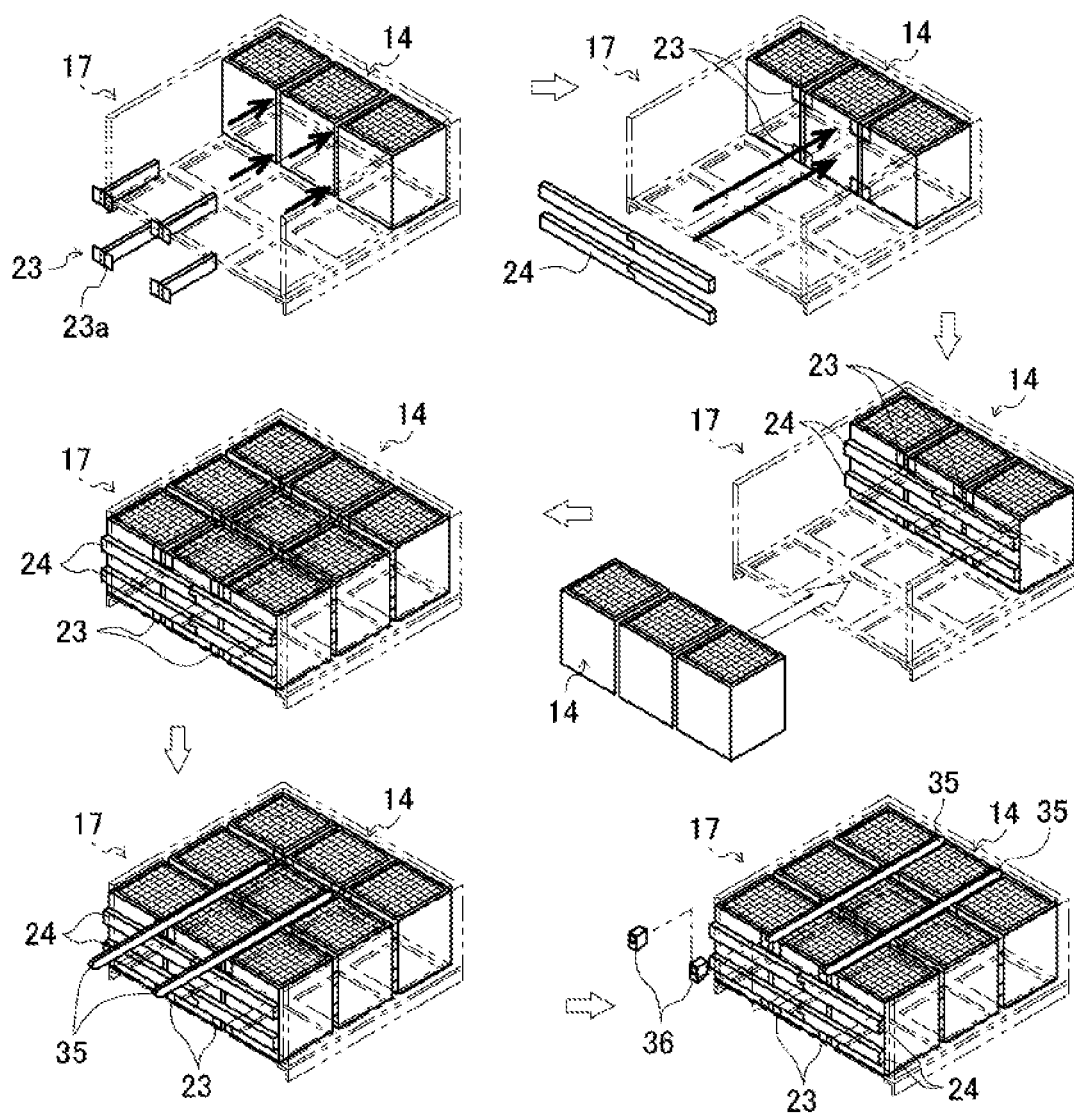
FIG. 10 shows perspective views illustrating how catalytic cassettes are placed and fixed in a support frame.

With reference to FIGS. 8 to 10, the following will describe the fixing member 34.

As illustrated in FIGS. 8 to 9B, the fixing member 34 is disposed to extend along the direction from the opening to the side surface opposed to the opening. The fixing member 34 is configured to be urged by the lid member closing the opening and consequently press upper surfaces of the plurality of catalytic cassettes.

The fixing member 34 includes a plate-shaped member 35 and a pressing member 36. The plate-shaped member 35 extends, over upper surfaces of the plurality of catalytic cassettes, in the direction from the opening to the side surface opposed to the opening. The pressing member 36 is configured to press one edge of the plate-shaped member 35 when the pressing member 36 is urged by the lid member closing the opening. The following will describe a method for fixing, by use of the fixing member 34, the first catalytic cassettes 14 charged through the first opening 13a. A method for fixing, by use of the fixing member 34, the second catalytic cassettes 15 charged through the second opening 13b is similar to the method for fixing the first catalytic cassettes 14, and therefore description thereof is omitted.

The plate-shaped member 35 is a substantially cuboid member extending from a first side to a second side. The plate-shaped member 35 has an upper surface (downstream-side surface) including slope portions 35a that are located close to the first and second sides and inclined toward edges of the first and second sides, respectively. A longitudinal length of the plate-shaped member 35 is set to be approximately equal to a length from the first opening 13a to the side surface (partitioning plate 13c) opposed to the first opening 13a. The slope portion 35a of the plate-shaped member 35 that is close to the partitioning plate 13c is configured such that the slope portion 35a can be fitted to a receiving portion 37 provided to the partitioning plate 13c.

The plate-shaped member 35 is disposed at a location which is between, among the first catalytic cassettes 14 charged through the first opening 13a, first catalytic cassettes 14 adjacent to each other in the width direction and which is over upper sides of such first catalytic cassettes 14. Specifically, the plate-shaped member 35 is disposed at a location which is between the first catalytic cassettes 14 adjacent to each other and in which the plate-shaped member 35 does not overlap the catalyst parts 14a of the first catalytic cassettes 14 when viewed from the exhaust-gas flow direction, i.e., which is over the outer peripheral parts 14b of the first catalytic cassettes 14 (see FIG. 10).

The pressing member 36 is provided at the one edge of the plate-shaped member 35, the one edge being close to the first opening 13a. The pressing member 36 is configured to be pressed from the first opening 13a side when the first lid member 26 is attached to the first opening 13a. The pressing member 36 is formed in a substantial cuboid, and has a lower surface (upstream-side surface) including a slope portion 36a. The slope portion 36a of the pressing member 36 is formed to have an inclination angle substantially identical to that of the slope portion 35a of the plate-shaped member 35, so that the slope portion 36a can abut on the slope portion 35a of the plate-shaped member 35. The slope portion 36a of the pressing member 36 is set such that the slope portion 36a abuts on the slope portion 35a of the plate-shaped member 35 at a suitable position to generate a suitable pressing force against the slope portion 35a of the plate-shaped member 35.

As illustrated in FIG. 9A and FIG. 9B, the pressing member 36 has a protrusion protruding toward the first opening 13a. The protrusion is constituted by a pin 36b attached to the pressing member 36 and a washer 36c. The pin 36b has a head shaped in a circular plate. The pressing member 36 has a surface facing the first opening 13a and having a hole. The pin 36b is attached to the hole via the washer 36c, so that the protrusion is given. By adjusting the number of washers 36c used to attach the pin 36b to the hole, it is possible to adjust a protruded length of the protrusion. By adjusting the protruded length of the protrusion, it is possible to make the slope portion 36a of the pressing member 36 abut on the slope portion 35a of the plate-shaped member 35 at a suitable position.

Movement of the pressing member 36 in the downstream direction relative to the slope portion 35a of the plate-shaped member 35 is regulated by an upper wall constituting the first opening 13a. Consequently, even when the pressing member 36 is urged by the first lid member 26, the pressing member 36 would not exceed the suitable position between the pressing member 36 and the slope portion 35a of the plate-shaped member 35. This allows the pressing member 36 to abut on the slope portion 35a of the plate-shaped member 35 at the suitable position.

In the configuration described above, when the first lid member 26 is attached to the first opening 13a, the head of the pin 36b included in the protrusion of the pressing member 36 is pressed by the first lid member 26. The pressing member 36 thus pressed generates a pressing force against an abutting surface (i.e., a surface via which the plate-shaped member 35 abuts on the pressing member 36) of the plate-shaped member 35. At this time, to the abutting surface of the plate-shaped member 35, a force component in a direction parallel to a longitudinal direction of the plate-shaped member 35 and a force component perpendicular to the longitudinal direction are applied. By the force components thus applied, the plurality of first catalytic cassettes 14 arranged across the fixing member 34 is pressed onto the first support frame 17. Consequently, the first catalytic cassettes 14 are fixed to the first support frame 17. In the above-described manner, the catalytic cassettes arranged adjacent to each other in the width direction can be fixed to the catalytic reactor 12 by the fixing member 34.

With reference to FIG. 10, the following will describe procedures for charging the first catalytic cassettes 14 into the first support frame 17. Procedures for charging the second catalytic cassettes 15 into the second support frame 21 are similar to those for the first catalytic cassettes 14, and therefore description thereof is omitted.

First, first catalytic cassettes 14 are placed, by a crane or by human strength, in the furthest row with respect to the first opening 13a. Filling materials 23 are inserted into upper and lower ends of each of gaps between the first catalytic cassettes 14 thus placed. Each of the filling materials 23 is provided with a guide 23a, which makes it easier to insert the filling material 23 into the gap between the first catalytic cassettes 14. The first catalytic cassettes 14 thus placed have respective surfaces facing the first opening 13a. On these surfaces of the first catalytic cassettes 14, two filling materials 24 are attached by adhesive spray such that the filling materials 24 are laid across the plurality of first catalytic cassettes 14 adjacent to each other. The attachment of the filling materials 24 is performed such that the filling materials 24 do not overlap the upper and lower ends of the gaps in order to avoid the filling materials 24 being in contact with the guides 23a of the filling materials 23 having been inserted into the gaps between the first catalytic cassettes 14 adjacent to each other in the width direction. Therefore, in a similar manner to the above, first catalytic cassettes 14 are placed in the middle row and the closest row with respect to the first opening 13a in this order. Thereafter, filling materials 23 are inserted thereinto, and filling materials 24 are attached thereto.

Then, a plurality of plate-shaped members 35 is placed such that each plate-shaped member 35 is disposed above a respective one of the gaps between the first catalytic cassettes 14 adjacent to each other in the width direction and along the direction from the first opening 13a to the side surface (partitioning plate 13c) opposed to the first opening 13a. The plate-shaped members 35 respectively have ends close to the partitioning plate 13c, and these ends are respectively fitted to the receiving portions 37 attached to the partitioning plate 13c. The plate-shaped members 35 respectively have ends close to the first opening 13a, and these ends are respectively provided with the pressing members 36 including the protrusions whose protruded lengths have been adjusted. In addition, the first lid member 26 is attached to the first opening 13a. Consequently, the first catalytic cassettes 14 can be fixed to the catalytic reactor 12.

According to the above-described method for fixing the plurality of catalytic cassettes by pressing the upper surfaces of the catalytic cassettes, it is not necessary to measure gaps (in the width direction and the depth direction) between the catalytic cassettes and the housing 13 in advance and dispose filling materials and/or adjustment plates suitably conformed to the gaps thus measured. Thus, the plurality of catalytic cassettes can be easily fixed to the housing 13. Namely, the above-described method is a simple method for fixing catalytic cassettes in which a manufacturing error is allowed. Furthermore, the above-described method can stably fix the catalytic cassettes to the catalytic reactor 12. Consequently, it is possible to reduce NOx by the catalyst parts to adequately purify exhaust gas. This leads to enhancement in the performance of the catalytic reactor 12.

Moreover, the plate-shaped member 35, which is included in the fixing member 34, is disposed at a location which is between the catalytic cassettes adjacent to each other in the width direction and in which the plate-shaped member 35 does not overlap the catalyst parts of the catalytic cassettes when viewed from the exhaust-gas flow direction, i.e., which is over the outer peripheral parts of the first catalytic cassettes. Consequently, it is possible to fix the plate-shaped member 35 while avoiding the plate-shaped member 35 hindering a flow of exhaust gas. Furthermore, even in a case where the number of catalytic cassettes to be charged into the catalytic reactor 12 is increased, fixing members 34 only need to be placed between catalytic cassettes adjacent to each other in the width direction. Thus, the attachment of the fixing members 34 does not involve any troublesome procedure. Therefore, it is possible to easily fix the catalytic cassettes to the catalytic reactor 12.

Moreover, according to the above-described method, the filling materials 23 and 24 are provided between the catalytic cassettes adjacent to each other. Consequently, it is possible to prevent a phenomenon that exhaust gas having flowed into the main flow path 32a included in the catalytic reactor 12 passes through the gaps between the catalytic cassettes and is emitted to the outside. Accordingly, it is possible to reduce NOx by the catalyst parts to adequately purify the exhaust gas.

Figure 11A:
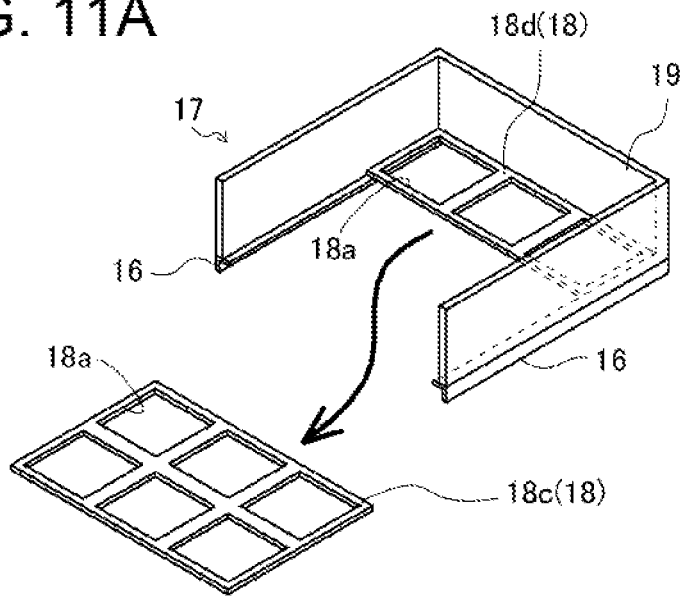
FIG. 11A is a perspective view of a lattice frame configured to be divisible.
Figure 11B:
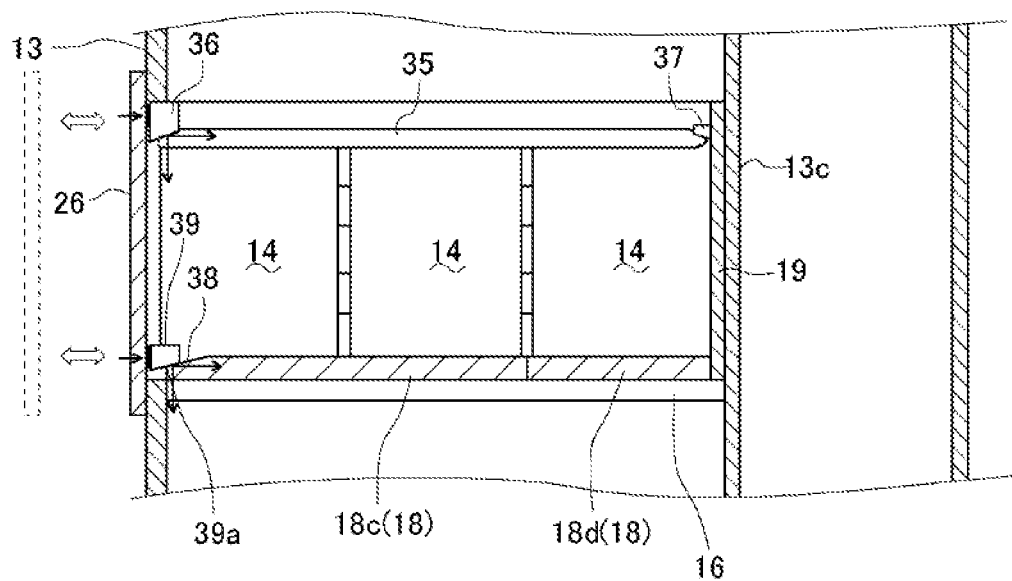
FIG. 11B is a side view of the lattice frame configured to be divisible.

As illustrated in FIG. 11A and FIG. 11B, the lattice frame may be configured to be divisible into an opening-side frame and an opposed-side frame opposed to the opening. The opening-side frame can be detachably attached to the opposed-side frame. The following will describe a splitting structure, focusing on a first lattice frame 18 on which a plurality of first catalytic cassettes 14 charged through a first opening 13a is placed.

The first lattice frame 18 is configured to be divisible into an opening-side frame 18c and an opposed-side frame 18d opposed to the opening. The opposed-side frame 18d is configured to allow only first catalytic cassettes 14 in the furthest row with respect to the first opening 13a to be placed thereon. Namely, the opening-side frame 18c is configured to allow only first catalytic cassettes 14 in the middle row and the closest row with respect to the first opening 13a to be placed thereon.

The opposed-side frame 18d is fixed to a housing 13 via a stay 16. Abutting surfaces of the opposed-side frame 18d and the opening-side frame 18c, via which the opening-side frame 18d and the opening-side frame 18c abut on each other, are configured to be engageable with each other. For example, the abutting surface of the opening-side frame 18c may have a pin protruding toward the opposed-side, and the abutting surface of the opposed-side frame 18d may have an engagement hole with which the pin is engageable. The opening-side frame 18c has an edge close to the first opening 13a, and the edge has a slope portion 38.

The slope portion 38 of the opening-side frame 18c is provided with a pressing member 39 configured to be capable of pressing the slope portion 38. The pressing member 39 has a configuration similar to that of the pressing member 36 included in the fixing member 34. The pressing member 39 is configured to be pressed from the first opening 13a side when a first lid member 26 is attached to the first opening 13a. The pressing member 39 is disposed at a slope portion 39a that can abut on the slope portion 38 of the opening-side frame 18c. The pressing member 39 has a protrusion protruding toward the first opening 13a. The protrusion has a protruded length that is adjustable. Movement of the pressing member 39 in the downstream direction relative to the slope portion 38 of the opening-side frame 18c is regulated by a stopper (not illustrated) provided to the first lid member 26.

In the configuration described above, when the first lid member 26 is attached to the first opening 13a, a force component in a direction parallel to the depth direction and a force component perpendicular to the depth direction are applied to the abutting surface of the pressing member 39. Due to the force components thus applied, the opening-side frame 18c is pressed by the opposed-side frame 18d, so that the opening-side frame 18c is fixed to the housing 13c.

With the above-described configuration in which the lattice frame is divisible into the opening-side frame and the opposed-side frame and the opening-side frame is detachably attached to the opposed-side frame, a work for placing catalytic cassettes in the furthest row with respect to the opening can be easily performed by detaching the opening-side frame from the opposed-side frame. Consequently, the attachment workability of the catalytic cassette can be improved.

Figure 12:
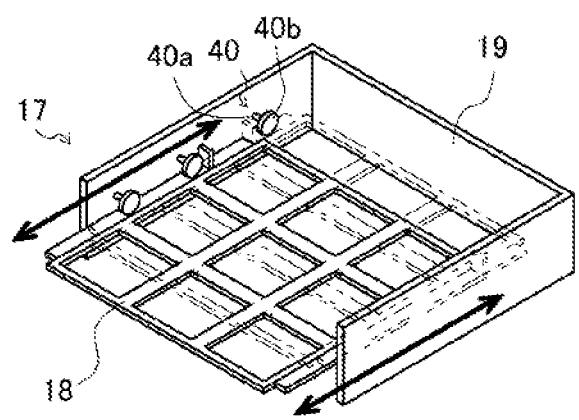
FIG. 12 A is a perspective view of a lattice frame configured to be slidingly movable.

As illustrated in FIG. 12, the lattice frame may be configured to be slidable in the depth direction. The following will describe a sliding structure of a first lattice frame 18. A housing 13 (wall 19) have both ends in the width direction respectively provided with rails 40 for slidably supporting the first lattice frame 18. Each of the rails 40 is constituted by support shafts 40a protruding inwardly from an inner side surface of the housing 13 and by rollers 40b rotatably supported by the support shafts 40a.

A single pair of support shafts 40a is disposed on an upstream side in the first lattice frame 18, and a single pair of support shafts 40a is disposed on a downstream side in the first lattice frame 18. Multiple pairs of support shafts 40a are arranged along the depth direction. The support shafts 40a respectively have inner edges provided with the rollers 40b, by which the edges of the first lattice frame 18 in the width direction are sandwiched.

With the configuration described above, moving the first lattice frame 18 along the rails 40 causes the rollers 40b of the rails 40 to rotate, so that the first lattice frame 18 slides. Consequently, for example, first catalytic cassettes 14 can be placed in the furthest row in the first lattice frame 18 by causing the first lattice frame 18 to slide along the rails 40 toward the operator's side. Thus, the operator can easily perform the placement work of the first catalytic cassettes 14 without leaning toward the furthest row through the first opening 13*a*. Thus, the attachment workability of the catalytic cassette can be improved.

INDUSTRIAL APPLICABILITY

The present invention is applicable to a catalytic reactor.

REFERENCE SIGNS LIST

1 exhaust gas purification device
12 catalytic reactor
13*a* first opening
13*b* second opening
14 first catalytic cassette
14*a* catalyst part
14*b* outer peripheral part
15 second catalytic cassette
15*a* catalyst part
15*b* outer peripheral part
18 first lattice frame
18*a* first inflow hole
18*b* first frame part
18*c* opening-side frame
18*d* opposed-side frame
21 second lattice frame
21*a* second inflow hole
21*b* second frame part
23 filling material
24 filling material
26 first lid member
27 second lid member
34 fixing member
100 ship

The invention claimed is:

1. A system comprising:
a catalytic reactor that:
   comprises a first side and a second side that opposes the first side; and
   defines an opening in the first side of the catalytic reactor;
a plurality of catalytic cassettes positioned within the opening, between the first side and the second side of the catalytic reactor, the plurality of catalytic cassettes arranged adjacent to each other;
a lid configured to cover the opening; and
a fixing member including:
   a plate-shaped member configured to extend between the opening and the second side of the catalytic reactor, the plate-shaped member comprising:
      a first end and a second end; and
      a slope portion that is inclined, the slope portion of the plate-shaped member defined at the first or second ends; and
   a pressing member defining a slope portion that is inclined and is configured to abut on the slope portion of the plate-shaped member.

2. The system as according to claim 1, wherein each of the catalyst cassettes includes:
   a catalyst part configured to reduce nitrogen oxides in exhaust gas; and
   a frame coupled to the catalyst part and configured to cover side surfaces of the catalyst part and the fixing member is disposed between a first catalytic cassette and a second catalytic cassette of the plurality of catalytic cassettes, and over the frame of the first and second catalytic cassettes.

3. The system according to claim 1, wherein
a filling material is disposed between first and second catalytic cassettes, the filling material extending along a direction from the opening toward the second side of the catalytic reactor.

4. The system according to claim 2, further comprising:
a ship; and
wherein the catalytic reactor is positioned on the ship.

5. The system according to claim 1, wherein:
the catalytic reactor comprises an inlet and an outlet;
the catalytic reactor defines a flow path of an exhaust gas from the inlet to the outlet; and
the plate-shaped member and the pressing member are positioned at a location upstream of the plurality of catalytic cassettes in the flow path of the exhaust gas.

6. The system according to claim 5, further comprising:
a partition plate disposed within the catalytic reactor;
wherein:
   the partition plate is positioned between the first side and the second side of the catalytic reactor and is substantially parallel to the flow path; and
   the fixing member and the plurality of catalytic cassettes are interposed between the opening and the partition plate.

7. The system according to claim 1, wherein the slope portion comprises a first bevel at the first end of the plate-shaped member and a second bevel at the second end of the plate-shaped member.

8. The system according to claim 7, wherein, while the plate-shaped member and the pressing member are positioned within the catalytic reactor, and the lid covers the opening:
   the pressing member is interposed between the first end of the plate-shaped member and the lid.

9. The system according to claim 7, wherein, while the plate-shaped member and the pressing member are positioned within the catalytic reactor, and the lid covers the opening:
   the slope portion of the pressing member abuts the slope portion of the plate-shaped member;
   a first end of the pressing member abuts the lid; and
   the slope portion of the pressing member is defined between the first end of the pressing member and a second end of the pressing member.

10. A catalytic reactor comprising:
a housing comprising a first side surface that defines one or more openings, each opening configured to receive a plurality of catalytic cassettes that reduce nitrogen oxide in exhaust gas;
a lid removably coupleable to the housing and configured to cover at least one of the one or more openings when coupled to the housing; and
a fixing member configured to be positioned within at least one opening to secure the plurality of catalytic cassettes, the fixing member comprising:
   a beam comprising:
      a first end that defines a first bevel; and
      a second end that defines a second bevel; and
   a pressing member comprising:
      a first end;
      a second end; and
      a sloped end that extends from the first end to the second end; and wherein the sloped end of the pressing member is configured to mate with the first bevel of the beam while the fixing member is positioned within the at least one opening.

11. The catalytic reactor of claim 10, wherein the housing defines:
an inlet;
an outlet; and
a flow path of an exhaust gas flowing from the inlet to the outlet.

12. The catalytic reactor of claim 11, wherein the beam and the pressing member are positioned at a location upstream of the plurality of catalytic cassettes in the flow path of the exhaust gas.

13. The catalytic reactor of claim 10, further comprising:
a catalyst support frame that comprises:
a lattice support frame; and
one or more sidewalls extending from the lattice support frame.

14. The catalytic reactor of claim 13, wherein:
each of the catalytic cassettes comprise a catalyst part configured to reduce nitrogen oxide in exhaust gas, the catalyst part comprising an upper surface, a lower surface, and side surfaces extending from the lower surface to the upper surface.

15. The catalytic reactor of claim 14, wherein:
each of the catalytic cassettes comprise a frame coupled to the catalyst part and configured to cover the side surfaces of the catalyst part.

16. The catalytic reactor of claim 13, wherein, while the beam and the pressing member are positioned within the catalytic reactor, and the lid covers the at least one opening:
the sloped end of the pressing member abuts the first bevel of the beam;
the first end of the pressing member abuts the lid; and
the pressing member is interposed between the first end of the beam and the lid.

17. The catalytic reactor of claim 16, wherein:
a first sidewall of the one or more sidewalls comprises a receiving portion that is inclined; and
while the beam and the pressing member are positioned within the catalytic reactor, and the lid covers the at least one opening, the second bevel of the beam abuts the receiving portion.

18. The catalytic reactor of claim 10, further comprising a plurality fixing members.

19. The catalytic reactor of claim 18, wherein:
each beam is positioned between a first set of catalytic cassettes of the plurality of catalytic cassettes and a second set of catalytic cassettes of the plurality of catalytic cassettes.

20. The catalytic reactor of claim 19, wherein:
the first set of catalytic cassettes comprises a first row of catalytic cassettes; and
the second set of catalytic cassettes comprises a second row of catalytic cassettes.

* * * * *